(12) United States Patent
Romano et al.

(10) Patent No.: US 8,006,937 B1
(45) Date of Patent: Aug. 30, 2011

(54) SPACECRAFT DOCKING INTERFACE MECHANISM

(75) Inventors: Marcello Romano, Monterey, CA (US); Paul Oppenheimer, Pacific Grove, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 401 days.

(21) Appl. No.: 12/367,207

(22) Filed: Feb. 6, 2009

(51) Int. Cl.
*B64G 1/64* (2006.01)

(52) U.S. Cl. .................................. 244/172.4; 244/172.5

(58) Field of Classification Search ............... 244/159.4, 244/172.4, 172.5, 172.6, 172.2
See application file for complete search history.

(56) References Cited

U.S. PATENT DOCUMENTS

| | | | |
|---|---|---|---|
| 4,198,081 A * | 4/1980 | Harrison et al. ............ | 285/381.2 |
| 4,954,952 A * | 9/1990 | Ubhayakar et al. ............ | 700/264 |
| 4,964,062 A * | 10/1990 | Ubhayakar et al. ............ | 700/249 |
| 5,261,632 A * | 11/1993 | Schoeffter ............... | 244/172.6 |
| 5,338,070 A * | 8/1994 | Horikawa et al. ........ | 285/148.23 |
| 5,687,995 A * | 11/1997 | Mori et al. .................. | 285/381.2 |
| 6,175,989 B1 * | 1/2001 | Carpenter et al. .............. | 16/225 |
| 6,568,638 B1 * | 5/2003 | Capots ........................ | 244/159.4 |
| 7,806,370 B2 * | 10/2010 | Beidleman et al. ........ | 244/172.7 |
| 2002/0000496 A1* | 1/2002 | Roth et al. ................. | 244/158 R |
| 2002/0040949 A1* | 4/2002 | Brei et al. .................. | 244/158 R |
| 2005/0263649 A1* | 12/2005 | Ritter et al. ................. | 244/172.4 |
| 2006/0145016 A1* | 7/2006 | Renfro ........................ | 244/158.1 |
| 2006/0145023 A1* | 7/2006 | Babb et al. .................. | 244/172.4 |
| 2007/0210212 A1* | 9/2007 | Tchoryk et al. ............. | 244/172.4 |
| 2009/0146011 A1* | 6/2009 | Ritter et al. ................. | 244/172.4 |
| 2009/0173832 A1* | 7/2009 | Hays et al. .................. | 244/172.4 |
| 2009/0173833 A1* | 7/2009 | Ritter et al. ................. | 244/172.4 |

OTHER PUBLICATIONS

ASDS—Autonomous Satellite Docking System [online]. Michigan Aerospace Corporation [retrieved on May 13, 2010]. Retrieved from the Internet: <URL:http://www.michiganaero.com/business_units/mechanical/asds.shtml>.
Christiansen, Scott and Nilson, Troy. Docking System for Autonomous, Un-manned Docking Operations [online] [retrieved on May 13, 2010]. Retrieved from the Internet: <URL: http://ieeexplore.ieee.org/stamp/stamp.jsp?tp=&arnumber=4526517&userType=inst>.
Pavlich, Jane, Tchoryk, Pete, Hays, Anthony, and Wassick, Gregory. KC-135 Zero G Testing of a Micro Satellite Docking Mechanism. Proceedings of SPIE [online]. 2003,vol. 5088 [retrieved on May 13, 2010]. Retrieved from the Internet: <URL: http://spiedl.aip.org/getpdf/servlet/GetPDFServlet?filetype=pdf&id=PSISDG00508800000 1000031000001&idtype=cvips&prog=normal>.
Rodgers, Lennon and Miller, David W. Concepts and Technology Development for the Autonomous Assembly and Reconfiguration of Modular Space Systems. MIT[online]. 2005 [retrieved May 13, 2010]. Retrieved from the Internet: <URL: http://ssl.mit.edu/publications/theses/SM-2005-RodgersLennon.pdf>.

* cited by examiner

*Primary Examiner* — Benjamin P Lee
(74) *Attorney, Agent, or Firm* — Donald E. Lincoln; Lisa A. Norris

(57) ABSTRACT

A demountable docking interface mechanism and method for docking and undocking two spacecraft utilizing the demountable docking interface mechanism.

19 Claims, 3 Drawing Sheets

SPACECRAFT DOCKING INTERFACE MECHANISM

BACKGROUND OF THE INVENTION

1. Field of the Invention

The present invention relates generally to docking mechanisms for spacecraft.

2. Description of the Related Art

The ability to dock multiple spacecraft has an enormous benefit for many spacecraft applications. Spacecraft that do not fit in a single launch vehicle can be launched independently and assembled in orbit. Furthermore, for instance, a broken module of a spacecraft can be jettisoned and replaced by a new module without having to replace the entire spacecraft.

A current limitation of all existing docking interface designs is the limited reliability and high complexity of their designs. In particular, the current Orbital Express docking interface design (Starsys Research Corporation, Boulder, Colo.) uses motors, gears, and cams to reach mechanical connection loads that are high enough to transfer fluid. Additional moving parts may decrease reliability while increasing the mass of the design. Reliability is a primary concern of all spacecraft missions. There is not a chance to repair the docking interface after the spacecraft has been launched.

Other docking interface designs such as Michigan Institute of Technology's Space System Lab and Michigan Aerospace Corporation do not allow for the transfer of fluid. Further, none of the current docking interface designs are scalable down to a CubeSat size spacecraft (10 cm×10 cm×10 cm).

A CubeSat is a spacecraft with dimensions of 10×10×10 centimeters (i.e., a volume of one liter), weighing no more than one kilogram, and typically using commercial off-the-shelf electronics components. CubeSats provide a mean for universities, companies and other organizations throughout the world to enter the realm of space science and exploration. Most CubeSats carry one or two scientific instruments as their primary mission payload. Miniaturized spacecrafts have application in low data rate communications systems, gathering data from multiple points and in-orbit inspection of larger spacecrafts.

SUMMARY OF THE INVENTION

Embodiments in accordance with the invention include a demountable docking interface mechanism and method for docking and undocking two spacecraft utilizing the demountable docking interface mechanism. Embodiments in accordance with the invention are best understood by reference to the following detailed description when read in conjunction with the accompanying drawings.

DETAILED DESCRIPTION OF THE INVENTION

Figure 1:
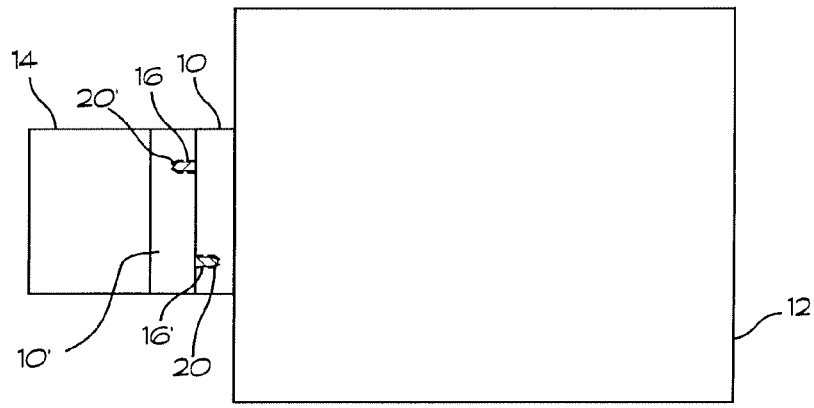
FIG. 1 is a side view block diagram illustrating a first docking interface mechanism attached to a first spacecraft and demountably coupled to a second docking interface mechanism attached to a second spacecraft in accordance with one embodiment.

FIG. 1 is a side view block diagram illustrating a first docking interface mechanism 10 attached to a first spacecraft 12 and demountably coupled to a second docking interface mechanism 10' attached to a second spacecraft 14 in accordance with one embodiment. In one embodiment, first docking interface mechanism 10 is a permanent component of first spacecraft 12, i.e., permanently formed in or on first spacecraft 12. In another embodiment, first docking interface mechanism 10 is detachable from first spacecraft 12, allowing reuse of first docking interface mechanism 10. In one embodiment, second docking interface mechanism 10' is a permanent component of second spacecraft 14, i.e., permanently formed in or on second spacecraft 14. In another embodiment, second docking interface mechanism 10' is detachable from second spacecraft 14, allowing reuse of second docking interface mechanism 10'.

For purposes of description, in one embodiment, first docking interface mechanism 10 and second docking interface mechanism 10' are substantially identical, and are used to demountably couple first spacecraft 12 and second spacecraft 14. Herein the use of the prime indicator symbol (') is used to differentiate substantially identical structures of second docking interface mechanism 10' from those of first docking interface mechanism 10.

Referring to FIG. 1, in one embodiment, a first alignment pin 16 extends from first docking interface mechanism 10 into a first alignment cup 20' of second docking interface mechanism 10'; and, a first alignment pin 16' extends from second docking interface mechanism 10' into a first alignment cup 20 of first docking interface mechanism 10. Additionally, although not shown in the side view of FIG. 1, in one embodiment, a second alignment pin 18 extends from first docking interface mechanism 10 into a second alignment cup 22' of second docking interface mechanism 10'; and, a second alignment pin 18' extends from second docking interface mechanism 10' into a second alignment cup 22 of first docking interface mechanism 10. First docking interface mechanism 10 is further described herein in detail, and also simply referred to as docking interface mechanism 10. Those of skill in the art can understand that the descriptions of docking interface mechanism 10 are also applicable to second docking interface mechanism 10'.

Herein the term spacecraft refers to any vehicle or object intended for transit through, or outside earth's atmosphere. Further herein the term space refers to the area outside Earth's atmosphere, unless otherwise specified.

Figure 2:
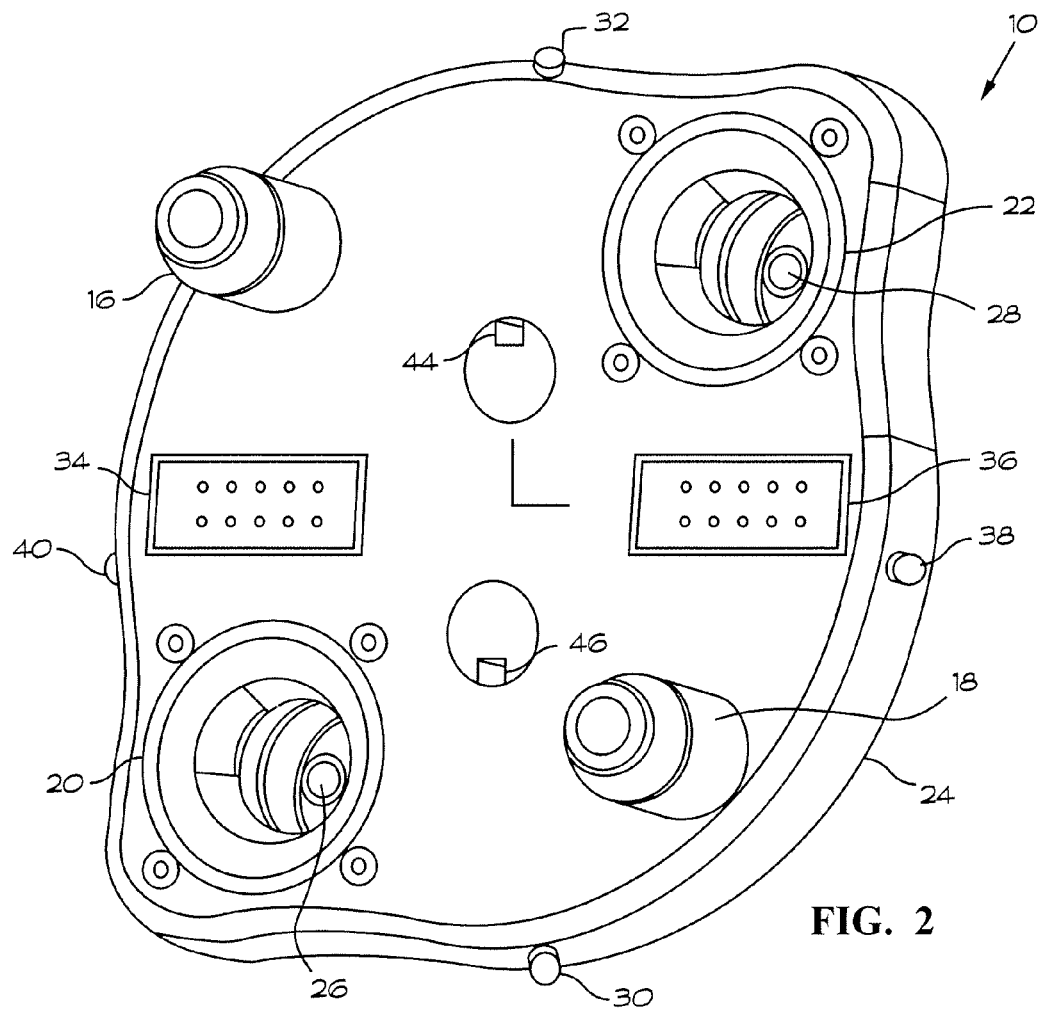
FIG. 2 is a perspective view of one of the docking interface mechanisms of FIG. 1 in accordance with one embodiment.

FIG. 2 is a perspective view of docking interface mechanism 10 in accordance with one embodiment. In one embodiment, docking interface mechanism 10 includes a frame 24 in which first alignment cup 20 and second alignment cup 22 are formed. In one embodiment first alignment cup 20 includes an alignment cup pipe 26; and second alignment cup 22 includes an alignment cup pipe 28. In one embodiment, first alignment cup 20 and second alignment cup 22 are substantially identical.

Frame 24 further includes first alignment pin 16 and second alignment pin 18, a first data and power connector 34 and a second data and power connector 36, and four thrusters, respectively, thrusters 30, 32, 38, and 40. In one embodiment first alignment pin 16 and second alignment pin 18 are substantially identical. In one embodiment, connectors 34 and 36 are used to pass electrical power and electrical data signals between first spacecraft 12 and second spacecraft 14 when docked. In one embodiment, frame 24 also includes one electromagnet having a first pole 44 and a second pole 46. The electromagnet with poles 44, 46 provide active assistance in close proximity operation alignment.

Referring to FIGS. 1 and 2, first alignment cup 20 and second alignment cup 22 of first docking interface mechanism 10 assist in guiding corresponding first alignment pin 16' and second alignment pin 18' of second docking interface mechanism 10' into position for docking, e.g., coupling, as first spacecraft 12 and second spacecraft 14 approach one another. Similarly, first alignment cup 20' and second alignment cup 22' of second docking interface mechanism 10' assist in guiding corresponding first alignment pin 16 and second alignment pin 18 of first docking interface mechanism 10 into position for docking.

The alignment pins 16, 18 of docking interface mechanism 10 are further described herein with reference to FIGS. 3-7. In the present illustrations, as alignment pins 16, 16', 18, 18', are, in one embodiment, substantially identical, only alignment pin 16 is described.

Figure 3:
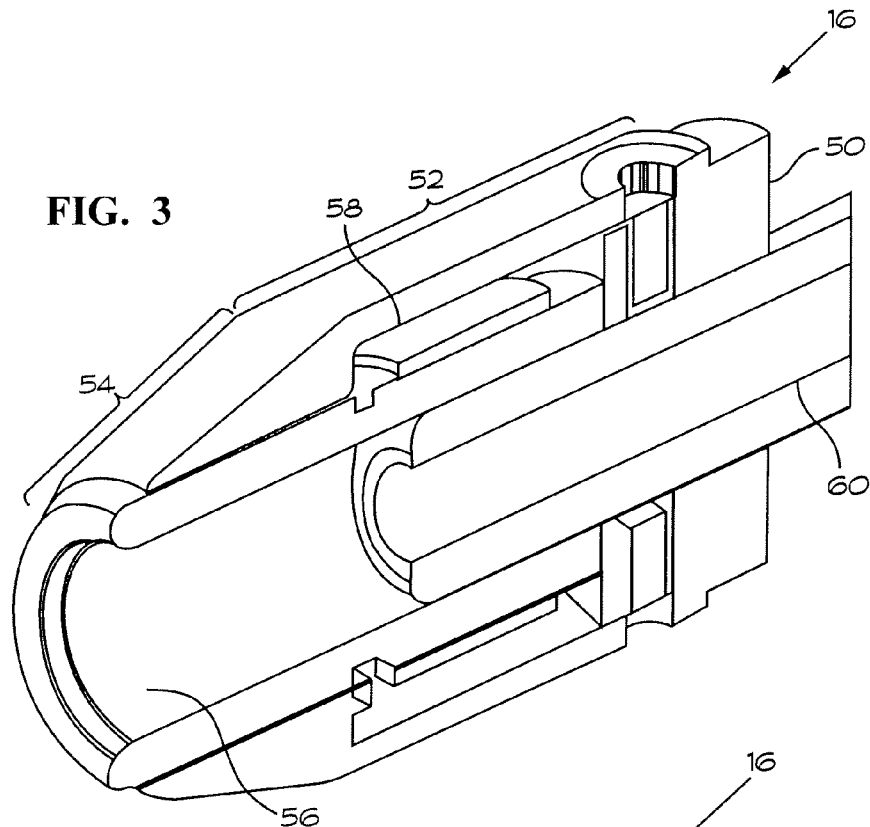
FIG. 3 is a cutaway perspective view of an alignment pin included in the docking interface mechanism of FIG. 2 in accordance with one embodiment.
Figure 4:
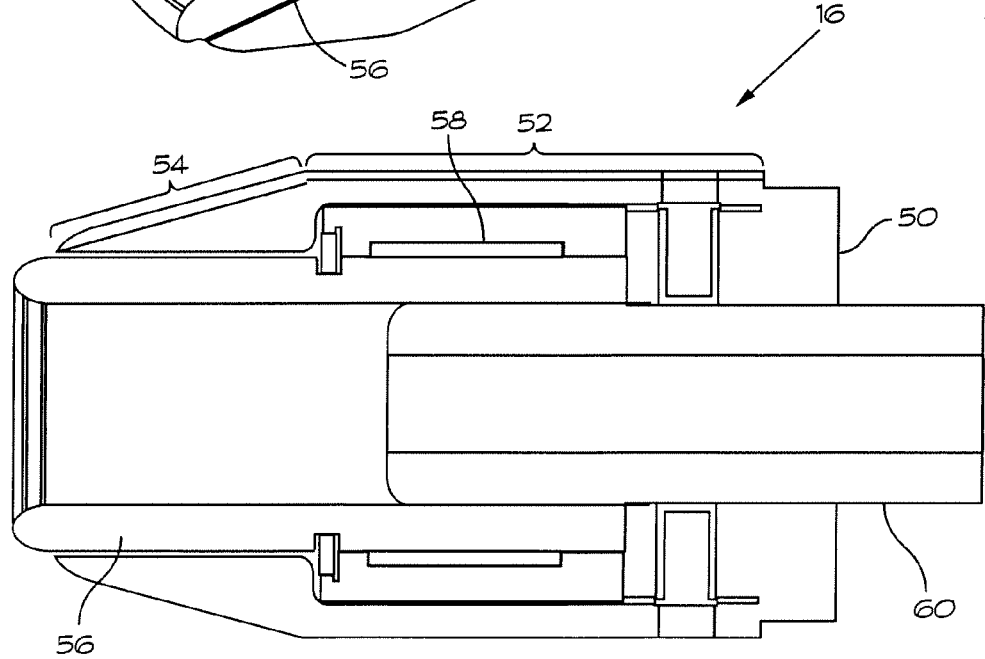
FIG. 4 is a cross sectional view of the alignment pin included in the docking interface mechanism of FIG. 2 in accordance with one embodiment.

FIG. 3 is a cutaway perspective view of first alignment pin 16 included in docking interface mechanism 10 in accordance with one embodiment. FIG. 4 is a cross sectional view of alignment pin 16 in accordance with one embodiment. Referring now to FIGS. 3 and 4 together, in one embodiment, first alignment pin 16 includes a sleeve 50 that has a cylindrical portion 52 and a tapered outer end portion 54. In one embodiment, end portion 54 is frustoconical in shape. A shape memory alloy (SMA) coupling 56 is located inside sleeve 50 with a heater 58 being arranged to heat SMA coupling 56. An alignment pin pipe 60 is located inside sleeve 50 to provide means for transferring fluids between first spacecraft 12 and second spacecraft 14 as well as a structural load path.

In one embodiment, SMA coupling 56 is formed of a nickel-titanium alloy (NiTi) which exists in two crystalline phases known as martensite and austenite. The NiTi alloy is in a martensite phase at temperatures at or below an associated martensitic temperature, i.e., a martensitic temperature associated with the NiTi alloy. Heating the NiTi alloy to an austenitic temperature, i.e., an austenitic temperature of the NiTi alloy, causes a phase change from the martensite phase to an austenite phase. The dimensions of SMA coupling 56 decrease during the phase change from martensite to austenite.

Operation of spacecraft docking with docking interface mechanism 10 is described with reference to FIGS. 5-7. For clarity of description spacecraft docking is described with reference to first alignment pin 16 of first spacecraft 12 and first alignment cup 20' of second spacecraft 14. Those of skill in the art can understand that the description is applicable to the remaining alignment pins 16', 18, 18' and alignment cups 20, 22', 22 earlier described.

Figure 5:
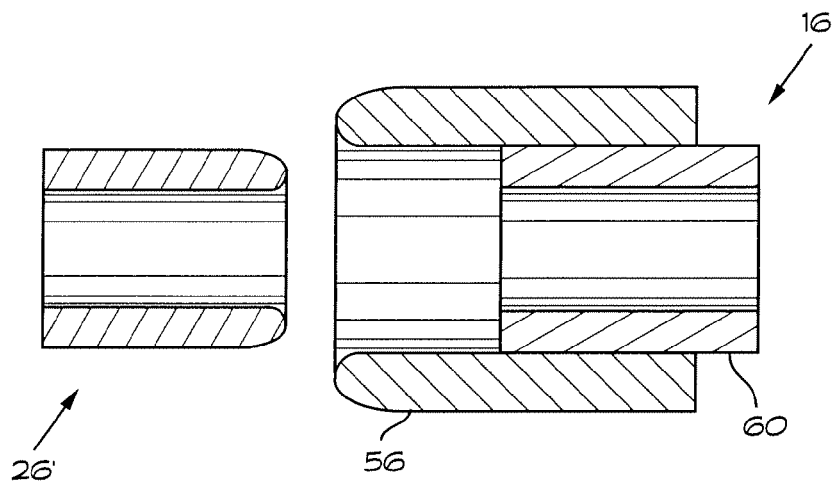
FIG. 5 is a partial cross sectional view showing the shape memory alloy coupling of an alignment pin of FIG. 2 approaching a cup pipe within a corresponding alignment cup in accordance with one embodiment.
Figure 6:
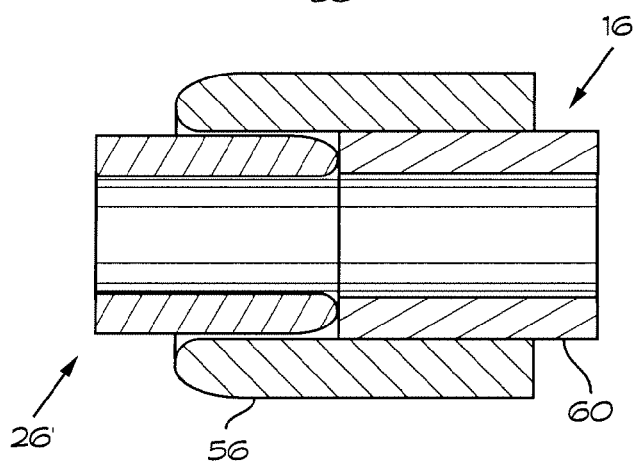
FIG. 6 is a partial cross sectional view showing the shape memory alloy coupling of the alignment pin of FIG. 5 in a soft mate configuration with the cup pipe within the corresponding alignment cup of FIG. 5 in accordance with one embodiment.
Figure 7:
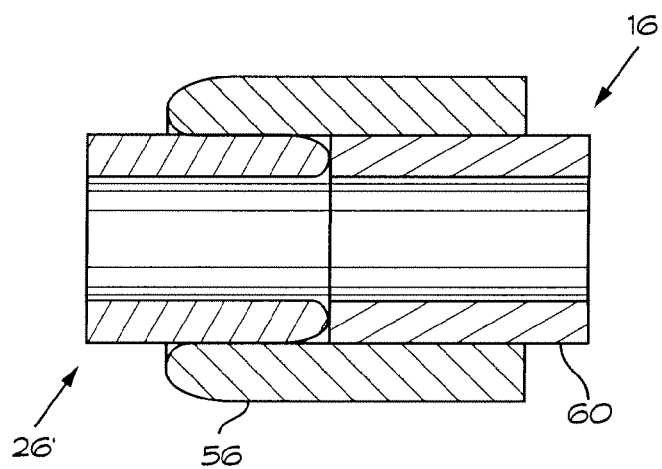
FIG. 7 is a partial cross sectional view showing the shape memory alloy coupling of the alignment pin of FIG. 6 in a hard mate configuration with the cup pipe within the corresponding alignment cup of FIG. 6 in accordance with one embodiment.

FIGS. 5, 6, and 7 notionally represent the coupling procedure, e.g., docking procedure, of docking interface mechanisms 10, 10' in accordance with one embodiment. FIG. 5 is a partial cross sectional view of an alignment cup pipe 26' internal to first alignment cup 20' of second docking interface mechanism 10' approaching SMA coupling 56 and an alignment pin pipe 60 of alignment pin 16 of first docking interface mechanism 10 in accordance with one embodiment.

Referring to FIGS. 1-5, first spacecraft 12 and/or second spacecraft 14 maneuvers into a docking position using integrated thrusters, such as integrated thrusters 30, 32, 38, 40 of first docking interface mechanism 10, and/or integrated thrusters 30', 32', 38', 40' of second docking interface mechanism 10'. Alignment pins 16, 16', 18, 18' and alignment cups 20, 20', 22, 22', earlier described with reference to first docking interface mechanism 10 and second docking interface mechanism 10', assist in guiding the fine alignment process.

FIG. 6 is a partial cross sectional view showing first docking interface mechanism 10 in a soft mate configuration with second docking interface mechanism 10' in accordance with one embodiment. In FIG. 6, first alignment pin 16 of first docking interface mechanism 10 is inserted into first alignment cup 20' of second docking interface mechanism 10' in a soft mate condition. In one embodiment, electromagnet poles 44, 46 of first docking interface mechanism 10 and/or electromagnet poles 44', 46' of second docking interface mechanism 10' are activated to assist in alignment. Herein in one embodiment a soft mate condition occurs when insertion of an alignment pin, e.g., alignment pin 16, 16', 18, 18', into an alignment cup, e.g., alignment cup 20, 20', 22, 22' is completed and the associated SMA coupling, e.g., SMA coupling 56, is below an associated austenitic temperature.

FIG. 7 is a partial cross sectional view showing first docking interface mechanism 10 in a hard mate configuration with second docking interface mechanism 10' in accordance with one embodiment. Herein in one embodiment a hard mate condition occurs when an SMA coupling of an alignment pin, such as SMA coupling 56 of first alignment pin 16 is inserted within an alignment cup, such as first alignment cup 20', is heated to an associated austenitic temperature forming a rigid connection so that data, power and fluids may be transferred into or out of the spacecraft, for example, via the transfer path created by connection of alignment cup pipe 26' with alignment pin pipe 60.

In one embodiment, power is applied to heating element 58 surrounding SMA coupling 56 to heat SMA coupling 56 to an associated austenitic temperature, so that SMA coupling 56 contracts to form a rigid mechanical connection and sealed fluid connection between first spacecraft 12 and second spacecraft 14. In one embodiment, the heat is generated by heating element 58. Generally viewed, the contraction of SMA coupling 56 results in SMA coupling 56 clamping down on alignment cup pipe 26' to form the rigid connection.

While docked, e.g., after the rigid mechanical connection is completed, in one embodiment, first spacecraft 12 and second spacecraft 14 have the capability to share data, power, and fluid, which can be used for propulsion.

In one embodiment, SMA coupling 56 is heated with redundant resistive heating elements, such as heating element 58. In one embodiment, sleeve 50 encases SMA coupling 56 to minimize the geometry required on the shape memory alloy. In one embodiment, alignment pin pipe 60 is formed of a material having a similar coefficient of thermal expansion as SMA coupling 56. In one embodiment, the material of alignment pin pipe 60 has a much higher hardness than the alloy of SMA coupling 56 for reusability. In one embodiment, alignment pin pipe 60 is formed of the material stainless steel 440C.

Although not illustrated, it can be understood by those of skill in the art that in undocking, SMA coupling 56 releases the mechanical connection when the temperature of SMA coupling 56 decreases to the associated martensitic temperature. In one embodiment, this associated martensitic temperature can be reached by using a Peltier-effect cooler. Thus in some embodiments, docking interface mechanism 10 further includes a cooling element, such as a Peltier-effect cooling element.

As described herein embodiments in accordance with the invention provide a docking interface mechanism for demountably coupling a first spacecraft with a second spacecraft. In some embodiments, the docking interface mechanism provides spacecraft active/passive assist in the close proximity operations of docking by adjusting the attitude of a spacecraft. In some embodiments, the docking interface mechanism reduces spacecraft maneuvering. In some embodiments, the docking interface mechanism provides connections for transferring electrical power and for transmitting control and data signals between spacecraft.

In some embodiments, the docking interface mechanism provides fluid (liquid/gas) transfer at pressures up to 3000 psi. In some embodiments, the docking interface mechanism does not require electrical power to maintain a mechanical connection in the docking process. In some embodiments, the docking interface mechanism includes integrated thrusters. In some embodiments, the docking interface mechanism includes integrated light emitting diodes and/or cameras. In some embodiments, the docking interface mechanism is scalable down to a 10 cm×10 cm footprint. In some embodiments, the docking interface mechanism utilizes less than three (3) Watts of power for actuation. In some embodiments, the docking interface mechanism is reusable for multiple docking/undocking cycles.

Herein although embodiments in accordance with the invention have been described with reference to spacecraft, the invention is not limited to spacecraft in orbit. Embodiments in accordance with the invention are applicable in separating two space vehicles after launch and may be used in any application where a releasable connection is made between two structures, including terrestrial, aerial and underwater applications.

What is claimed is:

1. A docking interface mechanism for spacecraft comprising:
    a frame;
    at least one alignment pin extending outward from the frame, the at least one alignment pin comprising:
        a sleeve;
        a shape memory alloy coupling mounted within the sleeve, the shape memory alloy coupling formed of a shape memory alloy;
        an alignment pin pipe located within the sleeve; and
        at least one heater mounted within the sleeve, the heater for controlling the temperature of the shape memory alloy coupling,
    wherein the at least one alignment pin is configured for insertion within a corresponding alignment cup of another docking interface mechanism when the shape memory alloy coupling is below an associated austenitic temperature of the shape memory alloy,
    wherein the at least one alignment pin is further configured to form a rigid mechanical connection with an alignment cup pipe in the corresponding alignment cup when the temperature of the shape memory alloy coupling increases to an associated austenitic temperature of the shape metal alloy,
    wherein the at least one alignment pin is further configured to release the rigid mechanical connection when the temperature of the shape memory alloy coupling decreases to an associated martensitic temperature of the shape metal alloy; and
    at least one alignment cup set in the frame, the at least one alignment cup configured to receive a corresponding alignment pin, the at least one alignment cup including an alignment cup pipe.

2. The docking interface mechanism of claim 1 further comprising:
    at least one electrical contact set in the frame, the at least one electrical contact configured to connect with a corresponding electrical contact.

3. The docking interface mechanism of claim 1 further comprising:
    at least one mass expulsion device set in the frame.

4. The docking interface mechanism of claim 1 further comprising:
    at least one electromagnet set in the frame.

5. The docking interface mechanism of claim 1 wherein the docking interface mechanism is scalable down to a 10 cm×10 cm footprint.

6. The docking interface mechanism of claim 1 wherein the shape memory alloy is a nickel-titanium alloy (NiTi).

7. The docking interface mechanism of claim 1 wherein the sleeve has a cylindrical portion and a frustoconical tapered outer end portion.

8. The docking interface mechanism of claim 1 wherein the pipe is formed of a material having a similar coefficient of thermal expansion as the shape metal alloy coupling.

9. The docking interface mechanism of claim 1 wherein the pipe is formed of a material having a higher hardness than the shape metal alloy of the shape metal alloy coupling.

10. The docking interface mechanism of claim 1 wherein the pipe is formed stainless steel 440C.

11. The docking interface mechanism of claim 1 where the pipe allows fluid (liquid/gas) transfer at pressures up to 3000 psi.

12. The docking interface mechanism of claim 1 wherein the docking interface mechanism is demountable.

13. The docking interface mechanism of claim 1 wherein the docking interface mechanism is connected to a spacecraft.

14. The docking interface mechanism of claim 1 wherein the docking interface mechanism is connected to a rocket system.

15. A method comprising:
    obtaining a first spacecraft, the first spacecraft having a first demountable docking interface mechanism, the first demountable docking interface mechanism comprising:
        a frame;
        a plurality of first alignment pins extending outward from the frame, each of the plurality of first alignment pins comprising:
            a sleeve;
            a shape memory alloy coupling mounted within the sleeve, the shape memory alloy coupling formed of a shape memory alloy;
            an alignment pin pipe located within the sleeve; and
            at least one heater mounted within the sleeve, the heater for controlling the temperature of the shape memory alloy coupling; and a plurality of first alignment cups set in the frame, each including an alignment cup pipe;

obtaining a second spacecraft, the second spacecraft having a second demountable docking interface mechanism, the second demountable docking interface mechanism comprising:

a frame;

a plurality of second alignment pins extending outward from the frame, each of the plurality of alignment pins comprising:

a sleeve;

a shape memory alloy coupling mounted within the sleeve, the shape memory alloy coupling formed of a shape memory alloy;

an alignment pin pipe located within the sleeve; and at least one heater mounted within the sleeve, the heater for controlling the temperature of the shape memory alloy coupling; and a plurality of second alignment cups set in the frame, each including an alignment cup pipe;

inserting each of the plurality of first alignment pins into corresponding second alignment cups, and each of the plurality of second alignment pins into corresponding first alignment cups, when each of the shape memory alloy couplings is below an associated austenitic temperature until a soft mate condition is achieved; and increasing the temperature of each of the shape memory alloy coupling to an associated austenitic temperature to form a rigid hard mate demountable docking connection between the first spacecraft and the second spacecraft.

16. The method of claim 15 further comprising:

decreasing the temperature of the shape memory alloy couplings to an associated martensitic temperature of the shape metal alloy by using a cooling device, as, for instance, a Peltier-effect cooler; and releasing the demountable docking connection, wherein the releasing disengages the first spacecraft from the second spacecraft.

17. The method of claim 15 wherein the second spacecraft is a rocket system utilized in propelling the first spacecraft.

18. The method of claim 15 wherein upon formation of the rigid hard mate demountable docking connection between the first spacecraft and the second spacecraft, each alignment pin pipe forms a connection to a corresponding alignment cup pipe, the connection allowing fluid transfer between the first spacecraft and the second spacecraft.

19. The method of claim 18 wherein each connection allows fluid (liquid/gas) transfer at pressures up to 3000 psi.

* * * * *